(12) United States Patent
Gu et al.

(10) Patent No.: US 10,866,447 B2
(45) Date of Patent: Dec. 15, 2020

(54) DISPLAY PANEL, DISPLAY APPARATUS, AND METHOD FOR MANUFACTURING A DISPLAY PANEL

(71) Applicant: BOE Technology Group Co., Ltd., Beijing (CN)

(72) Inventors: Pinchao Gu, Beijing (CN); Xue Dong, Beijing (CN); Haisheng Wang, Beijing (CN); Chunwei Wu, Beijing (CN); Yingming Liu, Beijing (CN); Rui Xu, Beijing (CN); Changfeng Li, Beijing (CN); Yuzhen Guo, Beijing (CN); Lijun Zhao, Beijing (CN); Yanan Jia, Beijing (CN); Xiaoliang Ding, Beijing (CN); Yunke Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 23 days.

(21) Appl. No.: 16/321,641

(22) PCT Filed: Jan. 31, 2018

(86) PCT No.: PCT/CN2018/074717
§ 371 (c)(1),
(2) Date: Jan. 29, 2019

(87) PCT Pub. No.: WO2019/007047
PCT Pub. Date: Jan. 10, 2019

(65) Prior Publication Data
US 2020/0201098 A1 Jun. 25, 2020

(30) Foreign Application Priority Data
Jul. 4, 2017 (CN) .......................... 2017 1 0537013

(51) Int. Cl.
G02F 1/1333 (2006.01)
G02F 1/1335 (2006.01)
G02F 1/1343 (2006.01)

(52) U.S. Cl.
CPC .... *G02F 1/13338* (2013.01); *G02F 1/133512* (2013.01); *G02F 1/134309* (2013.01); *G02F 2203/11* (2013.01)

(58) Field of Classification Search
CPC .............. G06K 9/00013; G06K 9/0008; G02F 1/13338; G02F 1/133512; G02F 1/134309; G02F 2203/11
(Continued)

(56) References Cited

U.S. PATENT DOCUMENTS 9,294,105 B2   3/2016 Gomm et al.
9,432,593 B2   8/2016 Yang et al.
(Continued)

FOREIGN PATENT DOCUMENTS

CN   102426500 A   4/2012
CN   102439538 A   5/2012
(Continued)

OTHER PUBLICATIONS

International Search Report (including English translation) and Written Opinion (including English translation of Box V) for International Application No. PCT/CN2018/074717, dated Apr. 27, 2018, 14 pages
(Continued)

*Primary Examiner* — Charles S Chang
(74) *Attorney, Agent, or Firm* — Westman, Champlin & Koehler, P.A.

(57) ABSTRACT

Embodiments of the present disclosure disclose a display panel, a display apparatus, and a method for manufacturing a display panel. The display panel includes: a display unit
(Continued)

comprising an array substrate, a modulation structure and a black matrix having at least one hole, wherein the modulation structure is located between the black matrix and the array substrate; light emitting unit located between the modulation structure and the array substrate, and configured to emit light onto the modulation structure to generate structured light emitted from the modulation structure, so that the structured light passes through the at least one hole; and a light receiving unit, configured to receive reflected structured light obtained by the structured light being reflected by a measured object.

16 Claims, 10 Drawing Sheets

(58) Field of Classification Search
USPC .......................................................... 349/50
See application file for complete search history.

(56) References Cited

U.S. PATENT DOCUMENTS

| | | | |
|---|---|---|---|
| 9,450,033 B2 | 9/2016 | Suh et al. | |
| 2008/0055494 A1* | 3/2008 | Cernasov | ............ G02F 1/13338 |
| | | | 349/12 |
| 2010/0295773 A1 | 11/2010 | Alameh et al. | |
| 2012/0176298 A1 | 7/2012 | Suh et al. | |
| 2016/0365394 A1 | 12/2016 | Suh et al. | |
| 2017/0154570 A1 | 6/2017 | Suh et al. | |
| 2017/0161543 A1* | 6/2017 | Smith | ................ G06K 9/00013 |
| 2017/0205913 A1* | 7/2017 | Kimura | ................ G06F 3/0416 |
| 2019/0065810 A1 | 2/2019 | Xu et al. | |

FOREIGN PATENT DOCUMENTS

| | | |
|---|---|---|
| CN | 102592514 A | 7/2012 |
| CN | 104036226 A | 9/2014 |
| CN | 205750817 U | 11/2016 |
| CN | 106385511 A | 2/2017 |
| CN | 106412159 A | 2/2017 |
| CN | 106897701 A | 6/2017 |
| CN | 107422511 A | 12/2017 |

OTHER PUBLICATIONS

Office Action, including Search Report, for Chinese Patent Application No. 201710537013.6, dated Sep. 3, 2019, 13 pages.

* cited by examiner

US 10,866,447 B2

DISPLAY PANEL, DISPLAY APPARATUS, AND METHOD FOR MANUFACTURING A DISPLAY PANEL

CROSS-REFERENCE TO RELATED APPLICATION(S)

This application is a Section 371 National Stage application of International Application No. PCT/CN2018/074717, filed on 31 Jan. 2018, which published as WO 2018/007047 A1 on 10 Jan. 2019, and claims priority to Chinese Patent Application 201710537013.6, filed on Jul. 4, 2017, which are incorporated herein by reference in their entireties.

TECHNICAL FIELD

Embodiments of the present disclosure relate to the field of display, and more particularly, to a display panel, a display apparatus, and a method for manufacturing a display panel.

BACKGROUND

With the development of human-computer interaction technology, the application of gesture recognition technology has become more and more extensive. How to realize gesture recognition in a display area of a display apparatus is a technical problem to be solved in the art.

SUMMARY

The embodiments of the present disclosure provide a display panel, a display apparatus, and a method for manufacturing a display panel.

According to an aspect of the present disclosure, there is provided a display panel, comprising:

a display unit comprising an array substrate, a modulation structure and a black matrix having at least one hole, wherein the modulation structure is located between the black matrix and the array substrate;

a light emitting unit, located between the modulation structure and the array substrate, and configured to emit light onto the modulation structure to generate structured light emitted from the modulation structure, so that the structured light passes through the at least one hole; and a light receiving unit, configured to receive reflected structured light obtained by the structured light being reflected by a measured object.

In an example, the modulation structure comprises a liquid crystal layer; and the light emitting unit comprises at least one light source and at least one modulation electrode, wherein the light source is configured to emit light to the liquid crystal layer, and the modulation electrode is configured to enable the liquid crystal layer to convert light received from the light source into the structured light and emit the structured light to the at least one hole, wherein orthographic projection of the at least one modulation electrode on the array substrate is within a range of orthographic projection of the black matrix on the array substrate, and orthographic projection of the at least one hole on the array substrate is within a range of the orthographic projection of the at least one modulation electrode on the array substrate.

In an example, the at least one modulation electrode each is a grating electrode, and each of the at least one grating electrode comprises a plurality of comb-shaped electrodes arranged in any direction parallel to a plane where the array substrate is located.

In an example, a pitch between two adjacent comb-shaped electrodes is in a range from 0.25 µm to 1 µm, and the at least one hole has a diameter in a range from 1 µm to 3 µm.

In an example, the at least one modulation electrode is a plurality of strip-shaped electrodes.

In an example, the at least one hole has a diameter in a range from 1 µm to 2 µm.

In an example, the at least one light source comprises an infrared light source.

In an example, the infrared light source has a wavelength in a range from 1.5 µm to 6 µm.

In an example, the display panel further comprises: a common electrode layer located between the black matrix and the liquid crystal layer, wherein a potential difference between the common electrode layer and the modulation electrode causes the liquid crystal layer to convert the light received from the light source into the structured light.

In an example, the light receiving unit is located between the modulation structure and the array substrate.

In an example, there are filters disposed at the at least one hole.

In an example, the display panel further comprises: a gesture recognition unit configured to acquire a gesture of the measured object based on the reflected structured light.

According to another aspect of the present disclosure, there is provided a display apparatus, comprising:

the display panel according to the embodiments of the present disclosure; and a gesture recognition unit, configured to acquire a gesture of the measured object based on the reflected structured light.

According to another aspect of the present disclosure, there is provided a method for manufacturing the display panel according to the embodiments of the present disclosure, comprising:

forming at least one modulation electrode on an array substrate;

disposing at least one light source on the at least one modulation electrode;

forming a liquid crystal layer above the at least one light source; and forming a black matrix above the liquid crystal layer, wherein the black matrix has at least one hole formed therein to allow structured light from the liquid crystal layer to pass therethrough.

According to another aspect of the present disclosure, there is provided a method for manufacturing the display panel according to the embodiments of the present disclosure, comprising:

disposing a light receiving unit and a light emitting unit on an array substrate;

forming a modulation structure above the light emitting unit and the light receiving unit; and forming a black matrix above the modulation structure, wherein the black matrix has at least one hole formed therein to allow structured light from the modulation structure to pass therethrough.

According to another aspect of the present disclosure, there is provided a method for manufacturing the display panel according to the embodiments of the present disclosure, comprising:

disposing at least one light source on an array substrate;
forming at least one modulation electrode above the at least one light source;
forming a liquid crystal layer above the at least one modulation electrode; and
forming a black matrix above the liquid crystal layer,
wherein the black matrix has at least one hole formed therein to allow structured light from the liquid crystal layer to pass therethrough.

BRIEF DESCRIPTION OF THE DRAWINGS

In order to more clearly illustrate the technical solutions in the embodiments of the present disclosure or in the related art, the accompanying drawings required to be used in the description of the embodiments will be briefly described below. It is obvious that the accompanying drawings in the following description are merely some embodiments of the present disclosure, and are not intended to limit the present disclosure. Some other embodiments may also be obtained by those of ordinary skill in the art according to these accompanying drawings without any creative work. In the accompanying drawings.

DETAILED DESCRIPTION

In order to make the purposes, technical solutions and advantages of the embodiments of the present disclosure more clear, the technical solutions in the embodiments of the present disclosure will be clearly and completely described below in conjunction with the accompanying drawings in the embodiments of the present disclosure. Obviously, the embodiments described are a part of the embodiments of the present disclosure instead of all the embodiments. All other embodiments obtained by those of ordinary skill in the art based on the described embodiments of the present disclosure without contributing any creative work are within the protection scope of the present disclosure. It should be noted that throughout the accompanying drawings, the same elements are represented by the same or similar reference signs. In the following description, some specific embodiments are for illustrative purposes only and are not to be construed as limiting the present disclosure, but merely examples of the embodiments of the present disclosure. The conventional structure or construction will be omitted when it may cause confusion with the understanding of the present disclosure. It should be noted that shapes and dimensions of components in the figures do not reflect true sizes and proportions, but only illustrate contents of the embodiments of the present disclosure.

Unless otherwise defined, technical terms or scientific terms used in the embodiments of the present disclosure should be of ordinary meanings to those skilled in the art. "First", "second" and similar words used in the embodiments of the present disclosure do not represent any order, quantity or importance, but are merely used to distinguish between different constituent parts.

With the development of human-computer interaction technology, gesture recognition needs to be integrated into a display area of a display screen. A method for measuring structured light is an active optical measurement method capable of identifying spatial information (for example, information of a depth of field and a position) of a measured object, wherein the structured light refers to light having specific structured features (for example, patterns). A basic principle of the method for measuring structured light is that a structured light emitter projects structured light onto a surface of the measured object, an image sensor receives light reflected by the measured object and acquires information related to the specific structured features of the reflected light, and the information of the depth of field and the position of the measured object is calculated according to the acquired information. How to integrate a system for measuring structured light (for example, comprising the structured light emitter and the image sensor) into the display area of the display apparatus for gesture recognition is a technical problem in the art.

Figure 1A:
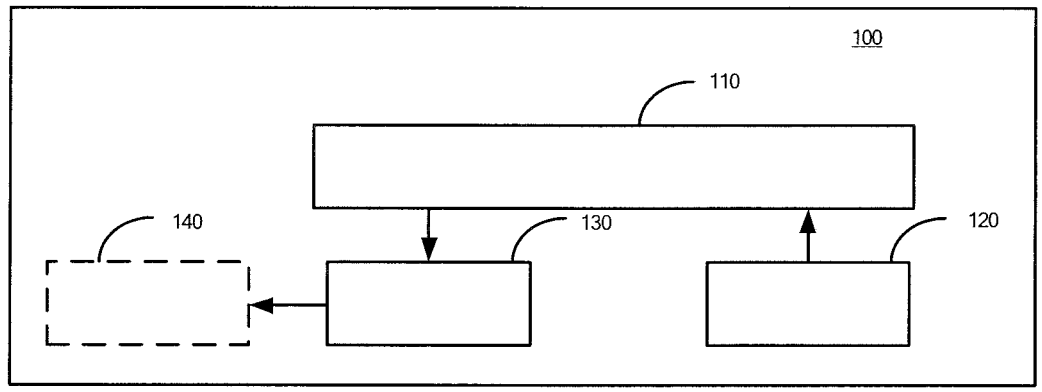
FIG. 1A illustrates a schematic block diagram of a display panel according to some exemplary embodiments of the present disclosure.

In order to solve or alleviate the above technical problem, some embodiments of the present disclosure propose a display panel. FIG. 1A illustrates a schematic block diagram of a display panel according to some exemplary embodiments of the present disclosure. As shown in FIG. 1A, the display panel 100 according to the embodiment of the present disclosure may comprise a display unit 110 including an array substrate, a modulation structure, and a black matrix having at least one hole. The display panel 100 further comprises a light emitting unit 120 located between the modulation structure and the array substrate, and configured to emit light onto the modulation structure to generate structured light emitted from the modulation structure, so that the structured light passes through the at least one hole. The display panel 100 further comprises a light receiving unit 130 configured to receive structured light reflected by a measured object. The display panel 100 may further comprise a gesture recognition unit 140 configured to acquire a gesture of the measured object from the reflected structured light received by the light receiving unit 130. In this way, structured light is emitted by the light emitting unit 120 through the modulation structure, the structured light is reflected by the measured object such as a human hand, information of the reflected light is acquired by the light receiving unit 130, and information of a depth of field and a position of the measured object is calculated by the gesture recognition unit 140 according to the information of the reflected light, thereby realizing gesture recognition in a display area of the display panel 100. It can be understood by those skilled in the art that functions of the gesture recognition unit 140 may be implemented by a control unit or a processing unit of a display apparatus, or may also be implemented by a dedicated control unit or a dedicated processing unit. In addition, it can be understood by those skilled in the art that the gesture recognition unit 140 may be integrated in the display panel 100, or may be disposed outside the display panel 100, or may even be remotely connected to the display panel 100 as long as gesture recognition may be implemented based on information related to the reflected light received by the light receiving unit 130.

Figure 1B:
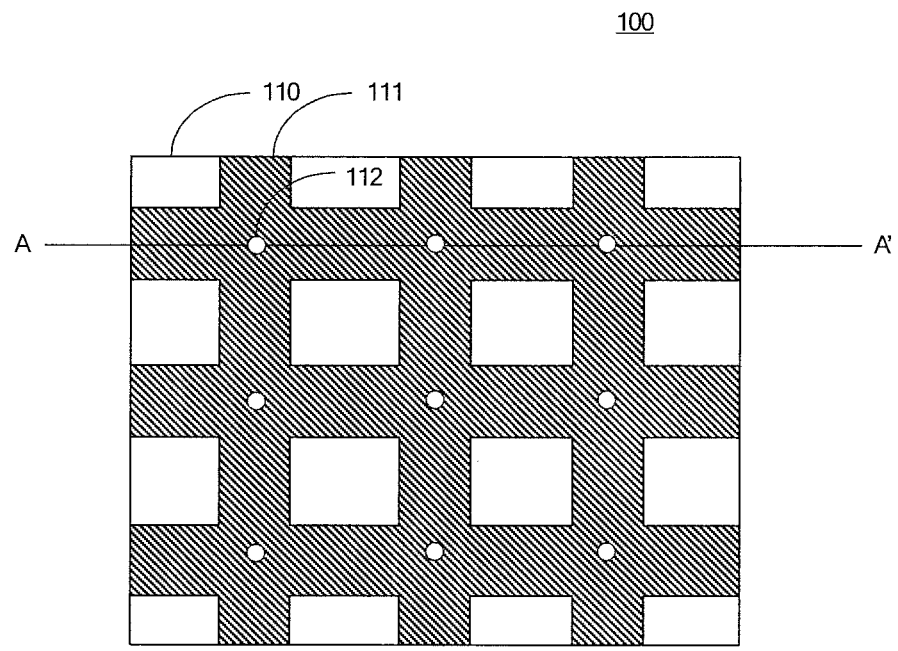
FIG. 1B illustrates a schematic plan view of a display panel according to some exemplary embodiments of the present disclosure.

FIG. 1B illustrates a schematic plan view of a display panel according to some exemplary embodiments of the present disclosure. As shown in FIG. 1B, the display panel 100 according to the embodiment of the present disclosure may comprise a display unit 110 including a black matrix 111 having at least one hole 112.

In an embodiment of FIGS. 2A-3C, the modulation structure is illustrated as including a liquid crystal layer (for example, a liquid crystal layer 214 or 314), and a light emitting unit 220 is illustrated as including at least one light source (for example, an infrared light source 222 or 322) and at least one modulation electrode (for example, grating electrode 221 or strip-shaped electrode 321). In some embodiments, the light source is configured to emit light to the liquid crystal layer, and the modulation electrode is configured to enable the liquid crystal layer to convert light received from the light source into structured light and emit the structured light to at least one hole in the black matrix.

In some embodiments, orthographic projection of the at least one modulation electrode on the array substrate is within a range of orthographic projection of the black matrix on the array substrate, and orthographic projection of the at least one hole on the array substrate is within a range of the orthographic projection of the at least one modulation electrode on the array substrate.

Figure 2A:
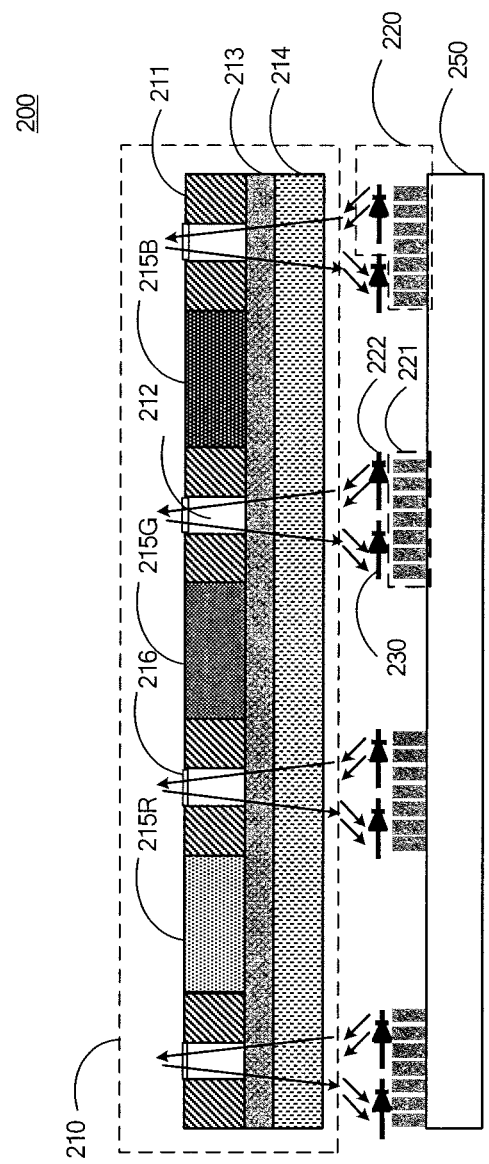
FIG. 2A illustrates a schematic cross-sectional view of the display panel according to the exemplary embodiment shown in FIG. 1B taken along A-A'.

Specifically, FIG. 2A illustrates a schematic cross-sectional view of the display panel according to the exemplary embodiment shown in FIG. 1B taken along A-A'. It is illustrated in FIG. 2A that the display panel 200 (the display panel 100 in FIG. 1A) comprises a display unit 210, a light emitting unit 220, and a light receiving unit 230.

According to the embodiment illustrated, the display unit 210 may comprise a black matrix 211 having at least one hole 212. The display unit 210 may further comprise a common electrode 213 located under the black matrix 211 and a liquid crystal layer 214 located under the common electrode 213. According to the embodiment illustrated, the display unit 210 may further comprise a color film layer disposed above the common electrode 213. The color film layer may comprise a red sub-pixel 215R, a green sub-pixel 215G, and a blue sub-pixel 215B disposed within the black matrixes 211. The light emitting unit 220 may comprise at least one modulation electrode, i.e., grating electrode 221 disposed under the liquid crystal layer 214 and comprising a plurality of comb-shaped electrodes arranged in any direction parallel to a plane where the array substrate 250 is located. For example, according to the embodiment illustrated, the at least one grating electrode 221 is disposed on an array substrate 250 and each comprises a plurality of comb-shaped electrodes, wherein a pitch between adjacent two comb-shaped electrodes is in a range from 0.25 μm to 1 μm. The light emitting unit 220 further comprises an infrared light source 222, and light emitted by the infrared light source 222 passes through the modulation structure formed by using the liquid crystal layer 214 to form structured light.

Figure 2B:
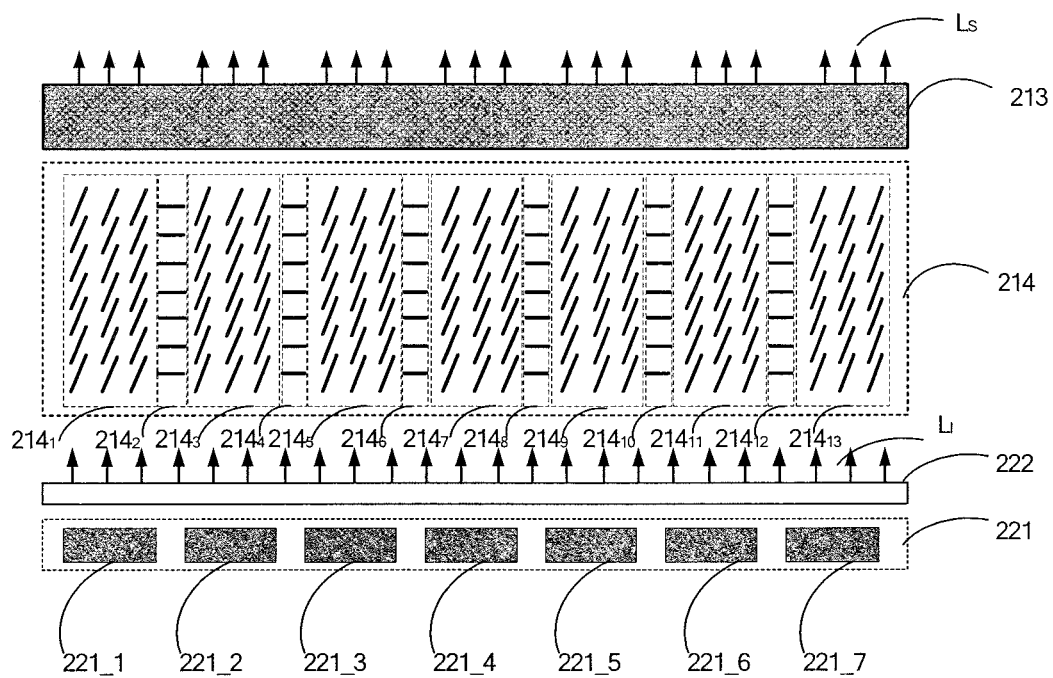
FIG. 2B illustrates a schematic diagram of using a liquid crystal layer as a modulation structure according to an embodiment of the present disclosure.

FIG. 2B illustrates a schematic diagram of using the liquid crystal layer 214 as the modulation structure according to an embodiment of the present disclosure. For convenience of description, as an example, it is illustrated in FIG. 2B that the liquid crystal layer 214 may be divided into liquid crystal cells $214_1$-$214_{13}$. By taking the grating electrode 221 including seven comb-shaped electrodes 221_1-221_7 as an example, when a voltage is applied between the grating electrode 221 and the common electrode 213, corresponding liquid crystal cells $214_1$, $214_3$, $214_5$, $214_7$, $214_9$, $214_{11}$ and $214_{13}$ above the comb-shaped electrodes 221_1-221_7 in the grating electrode 221 are deflected while liquid crystal cells $214_2$, $214_4$, $214_6$, $214_8$, $214_{19}$ and $214_{12}$ not corresponding to the comb-shaped electrodes 221_1-221_7 are not deflected. The comb-shaped electrodes may be implemented as transparent electrodes such as Indium Tin Oxide (ITO) electrodes. It can be understood by those skilled in the art that other transparent conductive materials may of course be used to implement the comb-shaped electrodes 221_1-221_7 in the grating electrode 221. According to an embodiment of the present disclosure, the grating electrode 221 cooperates with the common electrode 213 inherent to the display unit 210, and when a voltage is applied between each of the comb-shaped electrodes 221_1-221_7 of the grating electrode 221 and the common electrode 213, the gating electrode 221 may control deflection of liquid crystal cells above the comb-shaped electrodes 221_1-221_7 together with the common electrode 213, so that liquid crystal cells corresponding to the comb-shaped electrodes 221_1-221_7 is deflected while liquid crystal cells not corresponding to the comb-shaped electrodes 221_1-221_7 is not deflected. For example, the voltage applied between the common electrode 213 and the comb-shaped electrodes 221_1-221_7 may be 3V to 5V. It can be understood by those skilled in the art that the voltage applied between the common electrode 213 and the comb-shaped electrodes 221_1-221_7 may also be other values as long as the corresponding liquid crystal cells may be deflected.

Figure 2C:
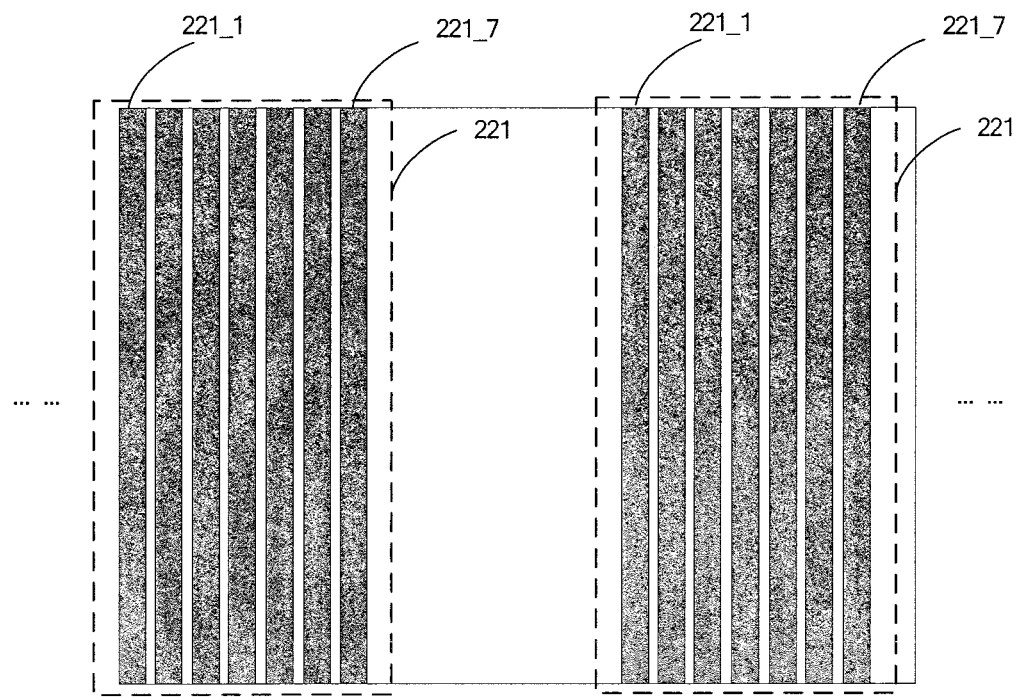
FIG. 2C illustrates a diagram of a grating electrode in FIG. 2B.

FIG. 2C illustrates a diagram of an arrangement of the grating electrodes 221. FIG. 2C illustrates two grating electrodes, each of which comprises seven comb-shaped electrodes 221_1-221_7 arranged in parallel. In this way, corresponding liquid crystal cells may have a cyclic strip shape of deflection-non-deflection-deflection, thereby achieving a cycle of light-transmission (light-proof)-light-proof (light-transmission)-light-transmission (light-proof) of the liquid crystal cells. It can be understood by those skilled in the art that although FIGS. 2B and 2C are each described by taking each of the grating electrodes including seven comb-shaped electrodes as an example, the grating electrodes according to the embodiment of the present disclosure may comprise other numbers of comb-shaped electrodes as long as they are operable to generate structured light.

As shown in FIG. 2B, an infrared light source 222 is disposed under the liquid crystal layer 214 and is configured to emit infrared light $L_I$. When the infrared light $L_I$ reaches the liquid crystal layer 214, a part of the infrared light may pass through the liquid crystal layer 214 while the other part of the infrared light may not pass through the liquid crystal layer 214 due to the light-transmission or light-proof of the liquid crystal cells. Light passing through the liquid crystal layer 214 exits from the holes, thereby generating structured light $L_S$. It can be understood by those skilled in the art that the comb-shaped electrodes may be constructed in any pattern and are not limited to the pattern shown in FIG. 2C. Further, as an example, FIG. 2B illustrates a case where the liquid crystal cells $214_1$, $214_3$, $214_5$, $214_7$, $214_9$, $214_{11}$ and $214_{13}$ are light-transmitted when the liquid crystal cells $214_1$, $214_3$, $214_5$, $214_7$, $214_9$, $214_{11}$ and $214_{13}$ are deflected.

The structured light $L_S$ generated by the modulation structure is irradiated to a measured object and is reflected by the measured object, wherein the reflected light $L_{SR}$ carries information of a position and a depth of field of the measured object at the moment, and enters the display panel through, for example, the holes 212 in FIG. 2A. Specifically, the structured light having a certain pattern is projected onto a surface of the measured object, and reflected light has a pattern which is deformed through modulation by a height of the measured object, and this deformation may be interpreted as a spatial carrier signal of which both a phase and amplitude are modulated. The deformed pattern is collected and demodulated, and information of the phase may be recovered, so as to determine the height according to the phase.

Referring back to FIG. 2A, the light receiving unit 230 receives the reflected light $L_{SR}$ corresponding to the information of the position and the depth of field of the measured object, and performs photoelectric conversion on the reflected light $L_{SR}$ to obtain an electric signal corresponding to the reflected light $L_{SR}$. The light receiving unit 230 may be implemented using, for example, photodiodes. It can be understood by those skilled in the art that other photoelectric conversion devices, such as phototransistors, photo PIN diodes, etc., are also used to achieve photoelectric conversion. For example, the gesture recognition unit 140 shown in FIG. 1A receives the electrical signal from the light receiving unit 230, demodulates the information of the position and the depth of field of the measured object from the corresponding electrical signal, and performs gesture recognition on the measured object. The gesture recognition unit 140 may be implemented, for example, using a control unit of the display panel. The demodulation operation of the electrical signal and the gesture recognition operation are implemented by the control unit. The gesture recognition may be implemented according to the information of the position and the depth of field by using various methods such as template matching, a lookup table, etc., which will not be described in detail in the embodiments of the present disclosure.

According to the embodiment shown in FIG. 2A, the holes 212 may have a diameter in a range from 1 μm to 3 μm. In order to reduce the interference of external light, filters (for example, infrared filters 216) may be disposed on the holes 212, so that only infrared light of a particular wavelength may exit from the holes 212 and only the infrared light of the particular wavelength may enter the display panel 200 through the holes 212. In order to reduce interference with normal display, in the embodiments of the present disclosure, the structured light is realized by using the infrared light, so that the structured light is invisible to human eyes. In addition, since a human body has a high reflectance for infrared light of a long wavelength, in order to increase the reflectance of the infrared light, a wavelength range of the infrared light source 222 and the infrared filters 216 may be set to be greater than 1.5 μm. In addition, in order to reduce the influence of infrared light emitted by the human body itself, the wavelength range of the infrared light source 222 and the infrared filters 216 may be set to be within 1.5 μm-6 μm.

The grating electrodes 221 are disposed to have projection thereof (i.e., orthographic projection on the array substrate 250) in a vertical direction which coincides with projection of the black matrix 211 in the vertical direction or is within the projection of the black matrix 211, so that the grating electrodes 221 according to the embodiments of the present disclosure control only liquid crystal cells having projection thereof in the vertical direction which coincides with the projection of the black matrix in the vertical direction or liquid crystal cells within the projection of the black matrix, which thus may not affect normal display of the display panel 200.

In addition, although it is illustrated in both FIGS. 2A and 2B that the infrared light source 222 is disposed above the grating electrode(s) 221, it can be understood by those skilled in the art that the infrared light source 222 may also be disposed under the grating electrode(s) 221. Since the grating electrode(s) 221 may be implemented as a transparent electrode(s), even if the infrared light source 222 is disposed under the grating electrode(s) 221, it does not affect the infrared light emitted by the infrared light source 222 passing through the liquid crystal layer 214.

Figure 3A:
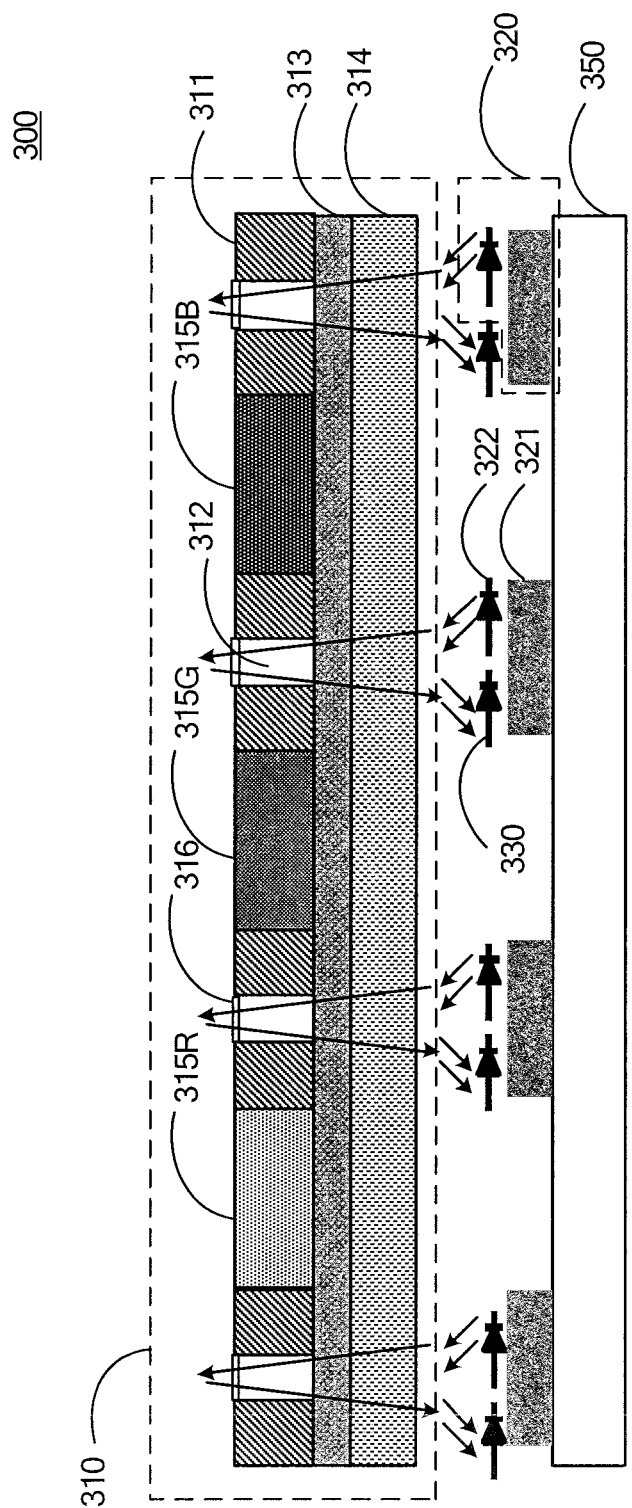
FIG. 3A illustrates another schematic cross-sectional view of the display panel according to the exemplary embodiment shown in FIG. 1B taken along A-A'.

FIG. 3A illustrates another schematic cross-sectional view of the display panel according to the exemplary embodiment shown in FIG. 1 taken along A-A'. It is illustrated in FIG. 3A that the display panel 300 (the display panel 100 in FIG. 1A) comprises a display unit 310, a light emitting unit 320, and a light receiving unit 330.

According to the embodiment illustrated, the display unit 310 may comprise a black matrix 311 having at least one hole 312. The display unit 310 may further comprise a common electrode 313 located under the black matrix 311 and a liquid crystal layer 314 located under the common electrode 313. According to the embodiment illustrated, the display unit 310 may further comprise a color film layer disposed above the common electrode 313. The color film layer may comprise a red sub-pixel 315R, a green sub-pixel 315G, and a blue sub-pixel 315B disposed within the black matrixes 311. The light emitting unit 320 may comprise a plurality of modulation electrodes, i.e., strip-shaped electrodes 321 disposed under the liquid crystal layer 314 and comprising comb-shaped electrodes arranged in any direction parallel to a plane where the array substrate 350 is located. For example, according to the embodiment illustrated, projection (i.e., orthographic projection on the array substrate 350) of the strip-shaped electrodes 321 in a vertical direction coincides with projection of the black matrix 311 in the vertical direction or is within the projection of the black matrix 311. The light emitting unit 320 further comprises an infrared light source 322, and light emitted by the infrared light source 322 passes through the modulation structure to form structured light.

Figure 3B:
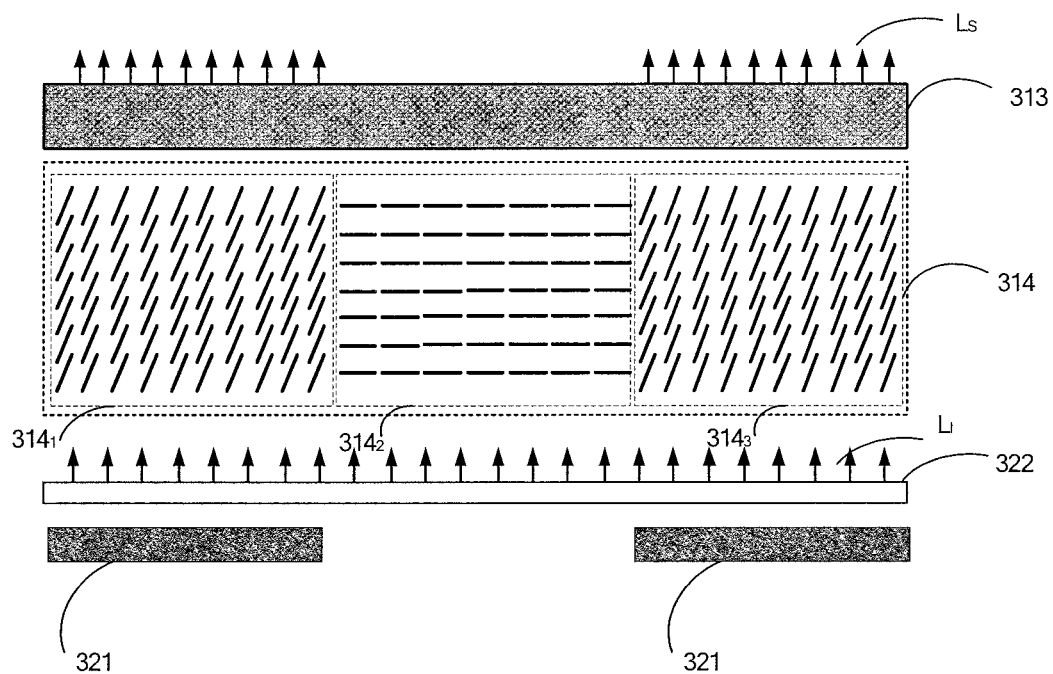
FIG. 3B illustrates a schematic diagram of using a liquid crystal layer as a modulation structure according to an embodiment of the present disclosure.

FIG. 3B illustrates a schematic diagram of using the liquid crystal layer 314 as the modulation structure according to an embodiment of the present disclosure. For convenience of description, as an example, it is illustrated in FIG. 3B that the liquid crystal layer 314 may be divided into liquid crystal cells $314_1$ to $314_3$. When a voltage is applied between the plurality of strip-shaped electrodes 321 and the common electrode 313, corresponding liquid crystal cells $314_1$ and $314_3$ above the strip-shaped electrodes 321 are deflected while the liquid crystal cells $314_2$ not corresponding to the strip-shaped electrodes 321 is not deflected. The strip-shaped electrodes 321 may be implemented as transparent electrodes such as ITO electrodes. It can be understood by those skilled in the art that the strip-shaped electrodes 321 may of course be implemented using other transparent conductive materials. According to an embodiment of the present disclosure, the plurality of strip-shaped electrodes 321 cooperate with the common electrode 313 inherent to the display unit, and when a voltage is applied between each of the strip-shaped electrodes 321 and the common electrode 313, the strip-shaped electrodes 321 may control deflection of liquid crystal cells above the strip-shaped electrodes 321 together with the common electrode 313, so that liquid crystal cells corresponding to the strip-shaped electrodes 321 is deflected while liquid crystal cells not corresponding to the strip-shaped electrodes 321 are not deflected. For example, the voltage applied between the common electrode 313 and the strip-shaped electrodes 321 may be 3V to 5V. It can be understood by those skilled in the art that the voltage applied between the common electrode 313 and the strip-shaped electrodes 321 may be other values as long as the corresponding liquid crystal cells may be deflected.

Figure 3C:
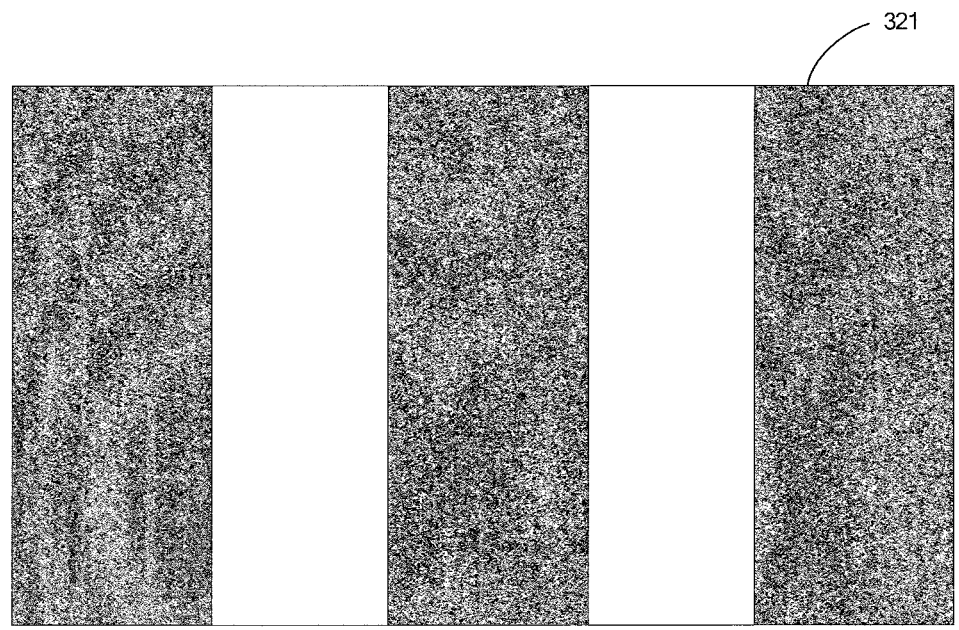
FIG. 3C illustrates a diagram of a strip-shaped electrode in FIG. 3B.

FIG. 3C illustrates a diagram of an arrangement of the plurality of strip-shaped electrodes 321. As shown in FIG. 3C, the plurality of strip-shaped electrodes 321 are arranged in parallel. In this way, corresponding liquid crystal cells may have a cyclic strip shape of deflection-non-deflection-deflection, thereby achieving a cycle of light-transmission (light-proof)-light-proof (light-transmission)-light-transmission (light-proof) of the liquid crystal cells. It can be understood by those skilled in the art that although FIG. 3B illustrates only two strip-shaped electrodes and FIG. 3C illustrates only three strip-shaped electrodes, in the embodiments of the present disclosure, there may be a greater number of strip-shaped electrodes, so that the strip-shaped electrodes may be operable to generate structured light.

As shown in FIGS. 3A and 3B, an infrared light source 322 is disposed under the liquid crystal layer 314 and is configured to emit infrared light $L_I$. When the infrared light $L_I$ reaches the liquid crystal layer 314, a part of the infrared light may pass through the liquid crystal layer 314 while the other part of the infrared light may not pass through the liquid crystal layer 314 due to the light-transmission or light-proof of the liquid crystal cells. Light passing through the liquid crystal layer 314 exits from the holes, thereby generating grating-type structured light $L_S$. It can be understood by those skilled in the art that the plurality of strip-shaped electrodes 321 may be constructed in any pattern and are not limited to the pattern shown in FIG. 3C. Further, as an example, FIG. 3B illustrates a case where the liquid crystal cells $314_1$ and $314_3$ are light-transmitted when the liquid crystal cells $314_1$ and $314_3$ are deflected.

The structured light $L_S$ generated by the modulation structure is irradiated to a measured object and is reflected by the measured object, wherein the reflected light $L_{SR}$ carries information of a position and a depth of field of the measured object at the moment, and enters the display panel through, for example, the holes 312 in FIG. 3A.

Referring back to FIG. 3A, the light receiving unit 330 receives the reflected light $L_{SR}$ corresponding to the information of the position and the depth of field of the measured object, and performs photoelectric conversion on the reflected light $L_{SR}$ to obtain an electric signal corresponding to the reflected light $L_{SR}$. The light receiving unit 330 may be implemented using, for example, photodiodes. It can be understood by those skilled in the art that other photoelectric conversion devices, such as phototransistors, photo PIN diodes, etc., are also used to achieve photoelectric conversion. For example, the gesture recognition unit 140 shown in FIG. 1A receives the electrical signal from the light receiving unit 330, demodulates the information of the position and the depth of field of the measured object from the corresponding electrical signal, and performs gesture recognition on the measured object. For the sake of brevity, content of FIG. 3A similar to that of the embodiment shown in FIG. 2A will not be described in detail again.

According to the embodiment illustrated in FIG. 3A, the holes 312 may have a diameter in a range from 1 μm to 2 μm. It should be illustrated that the diameter of the holes 312 in FIG. 3A may be slightly less than the diameter of the holes 212 in FIG. 2A. Similarly, infrared filters 316 may be disposed on the holes 312. In addition, a wavelength range of the infrared light source 322 and the infrared filters 316 may be set to be within 1.5 μm-6 μm.

The strip-shaped electrodes 321 are disposed to have projection thereof in a vertical direction which coincides with projection of the black matrix 311 in the vertical direction or is within the black matrix 311, so that the strip-shaped electrodes 321 according to the embodiments of the present disclosure control only liquid crystal cells having projection thereof in the vertical direction which coincides with the projection of the black matrix in the vertical direction or liquid crystal cells within the projection of the black matrix, which thus may not affect normal display of the display panel 300.

In addition, although it is illustrated in both FIGS. 3A and 3B that the infrared light source 322 is disposed above the strip-shaped electrodes 321, it can be understood by those skilled in the art that the infrared light source 322 may also be disposed under the strip-shaped electrodes 321. Since the strip-shaped electrodes 321 are implemented as transparent electrodes, even if the infrared light source 322 is disposed under the strip-shaped electrodes 321, it does not affect the infrared light emitted by the infrared light source 322 passing through the liquid crystal layer 314.

Figure 4A:
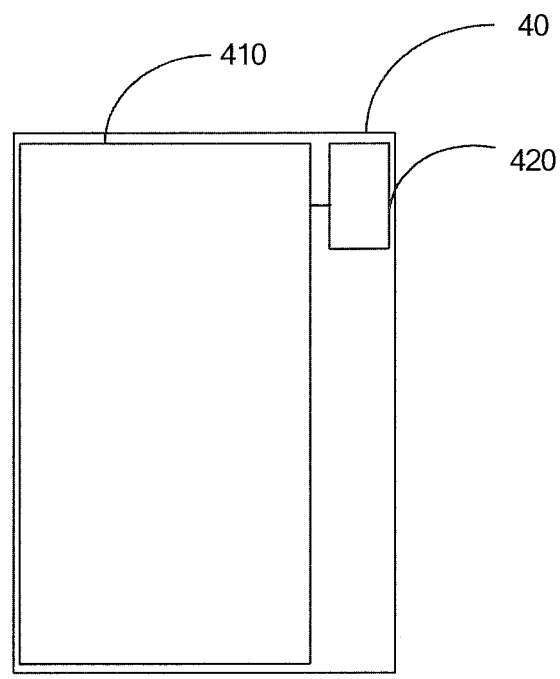
FIG. 4A illustrates a diagram of a display apparatus according to an exemplary embodiment of the present disclosure.

FIG. 4A illustrates a display apparatus according to an exemplary embodiment of the present disclosure. As shown in FIG. 4A, the display apparatus 40 may comprise a display panel 410 and a gesture recognition unit 420. The display panel 410 comprises the display unit, the light emitting unit, and the light receiving unit according to the embodiments of the present disclosure as described above. The gesture recognition unit 420 is connected to the display panel 410 and is configured to acquire a gesture of a measured object from reflected structured light received by the light receiving unit.

Figure 4B:
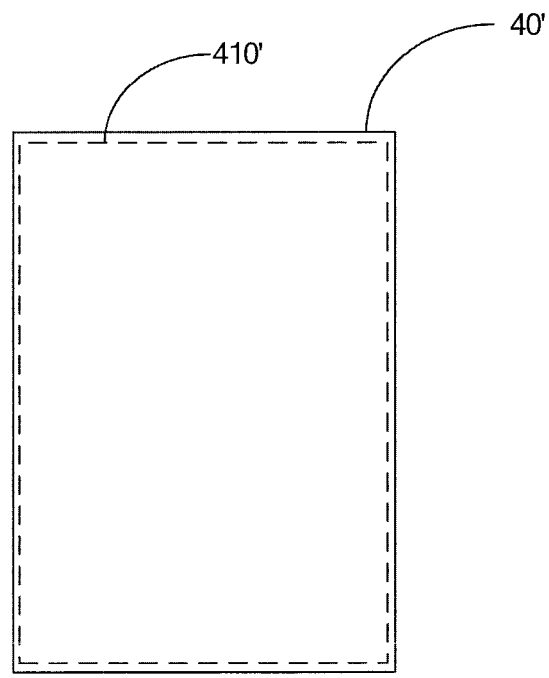
FIG. 4B illustrates a diagram of a display apparatus according to another exemplary embodiment of the present disclosure.

FIG. 4B illustrates a display apparatus according to another exemplary embodiment of the present disclosure. As shown in FIG. 4B, the display apparatus 40' may comprise a display panel 410'. The display panel 410' comprises the display unit, the light emitting unit, the light receiving unit, and the gesture recognition unit according to the embodiments of the present disclosure as described above.

The display apparatuses 40 and 40' according to the embodiments of the present disclosure may be any product or component having a display function such as an electronic paper, a mobile phone, a tablet, a television, a display, a notebook computer, a digital photo frame, a navigator, etc.

According to an embodiment of the present disclosure, there is provided a method for manufacturing a display panel. It should be illustrated that serial numbers of various steps in the following method are only used as a representation of the steps for description, and should not be regarded as indicating an execution order of the various steps. This method does not need to be performed exactly in an order as shown, unless explicitly stated.

Figure 5:
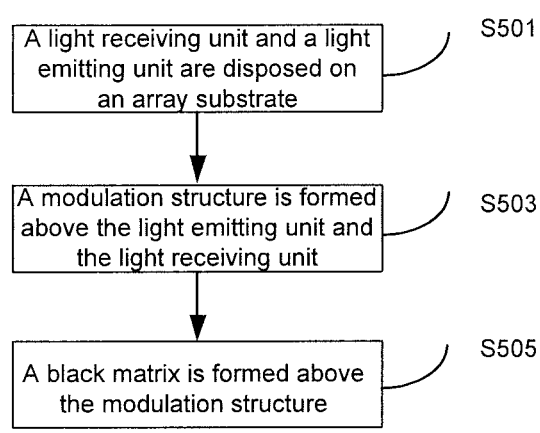
FIG. 5 illustrates a schematic flowchart of a method for manufacturing a display panel according to an embodiment of the present disclosure.

FIG. 5 illustrates a schematic flowchart of a method for manufacturing a display panel according to an embodiment of the present disclosure. As shown in FIG. 5, the method 500 for manufacturing a display panel according to the embodiment of the present disclosure may comprise the following steps.

In step S501, a light receiving unit and a light emitting unit are disposed on an array substrate.

In step S503, a modulation structure is formed above the light emitting unit and the light receiving unit.

In step S505, a black matrix is formed above the modulation structure.

Here, the black matrix has at least one hole formed therein to allow structured light from the modulation structure to pass therethrough.

Figure 6:
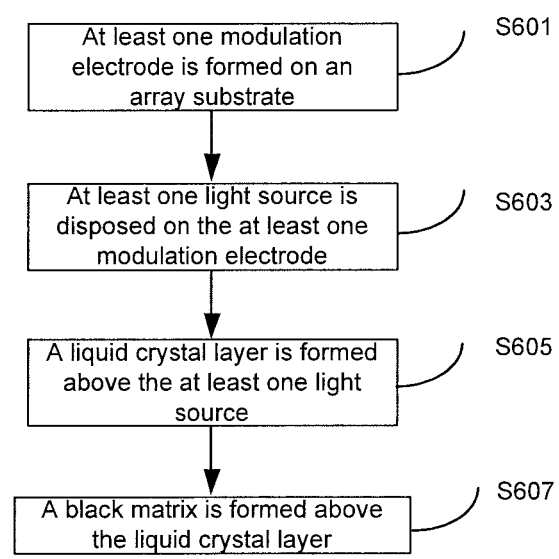
FIG. 6 illustrates a schematic flowchart of a method for manufacturing a display panel according to another embodiment of the present disclosure.

FIG. 6 illustrates a schematic flowchart of a method for manufacturing a display panel according to another embodiment of the present disclosure. In the embodiment corresponding to FIG. 6, for example, the modulation structure comprises a liquid crystal layer, and the light emitting unit comprises at least one light source and at least one modulation electrode. As shown in FIG. 6, the method 600 for manufacturing a display panel according to the embodiment of the present disclosure may comprise the following steps.

In step S601, at least one modulation electrode is formed on an array substrate.

In step S603, at least one light source is disposed on the at least one modulation electrode.

In step S605, a liquid crystal layer is formed above the at least one light source.

In step S607, a black matrix is formed above the liquid crystal layer.

Here, the black matrix has at least one hole formed therein to allow structured light from the liquid crystal layer to pass therethrough.

Figure 7:
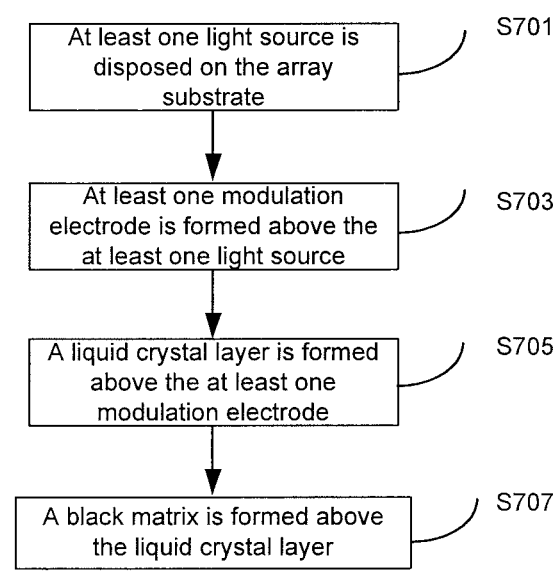
FIG. 7 illustrates a schematic flowchart of a method for manufacturing a display panel according to yet another embodiment of the present disclosure.
Figure 8:
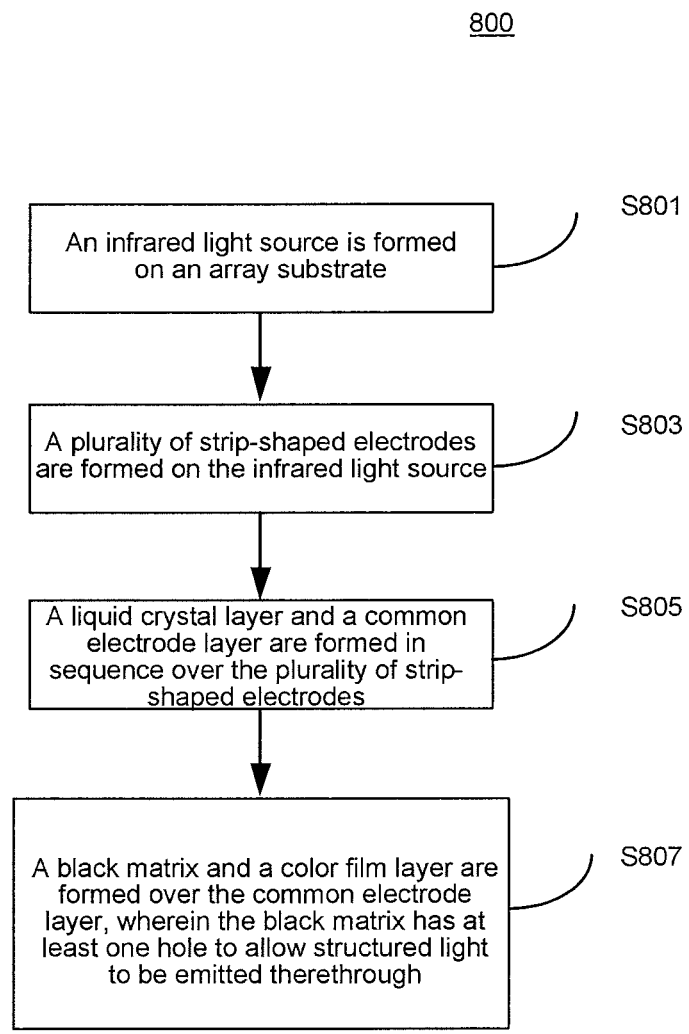
FIG. 8 illustrates a schematic flowchart of a method for manufacturing a display panel according to a further embodiment of the present disclosure.

FIG. 7 illustrates a schematic flowchart of a method for manufacturing a display panel according to yet another embodiment of the present disclosure. In the embodiment corresponding to FIG. 7, for example, the modulation structure comprises a liquid crystal layer, and the light emitting unit comprises at least one light source and at least one modulation electrode. As shown in FIG. 7, the method 700 for manufacturing a display panel according to the embodiment of the present disclosure may comprise the following steps.

In step S701, at least one light source is disposed on an array substrate.

In step S703, at least one modulation electrode is formed above the at least one light source.

In step S705, a liquid crystal layer is formed above the at least one modulation electrode.

In step S707, a black matrix is formed above the liquid crystal layer.

Here, the black matrix has at least one hole formed therein to allow structured light from the liquid crystal layer to pass therethrough.

Although the present disclosure has been particularly shown and described with reference to the exemplary embodiments of the present disclosure, it should be understood by those of ordinary skill in the art that various changes can be made to these embodiments in form and detail without departing from the spirit and scope of the present disclosure which are defined by the attached claims.

We claim:

1. A display panel, comprising:
a display unit comprising an array substrate, a modulation structure and a black matrix having at least one hole, wherein the modulation structure is located between the black matrix and the array substrate;
a light emitting unit, located between the modulation structure and the array substrate, and configured to emit light onto the modulation structure to generate structured light emitted from the modulation structure, so that the structured light passes through the at least one hole; and
a light receiving unit, configured to receive reflected structured light obtained by the structured light being reflected by a measured object;
wherein the modulation structure comprises a liquid crystal layer; the light emitting unit comprises at least one modulation electrode located below the liquid crystal layer and at least one light source located between the at least one modulation electrode and the liquid crystal layer,
wherein the light source is configured to emit light to the liquid crystal layer, and the modulation electrode is configured to enable the liquid crystal layer to convert light received from the light source into the structured light and emit the structured light to the at least one hole; the display panel further comprises a common electrode layer located between the black matrix and the liquid crystal layer, wherein a potential difference between the common electrode layer and the modulation electrode causes the liquid crystal layer to convert the light received from the light source into the structured light.

2. The display panel according to claim 1, wherein orthographic projection of the at least one modulation electrode on the array substrate is within a range of orthographic projection of the black matrix on the array substrate, and orthographic projection of the at least one hole on the array substrate is within a range of the orthographic projection of the at least one modulation electrode on the array substrate.

3. The display panel according to claim 2, wherein the at least one modulation electrode is a grating electrode, and each of the at least one grating electrode comprises a plurality of comb-shaped electrodes arranged in any direction parallel to a plane where the array substrate is located.

4. The display panel according to claim 3, wherein a pitch between two adjacent comb-shaped electrodes is in a range from 0.25 µm to 1 µm, and the at least one hole has a diameter in a range from 1 µm to 3 µm.

5. The display panel according to claim 2, wherein the at least one modulation electrode is a plurality of strip-shaped electrodes.

6. The display panel according to claim 5, wherein the at least one hole has a diameter in a range from 1 µm to 2 µm.

7. The display panel according to claim 2, wherein the at least one light source comprises an infrared light source.

8. The display panel according to claim 7, wherein the infrared light source has a wavelength in a range from 1.5 µm to 6 µm.

9. A method for manufacturing the display panel according to claim 2, comprising:
forming at least one modulation electrode on an array substrate;

disposing at least one light source on the at least one modulation electrode;

forming a liquid crystal layer above the at least one light source; and forming a black matrix above the liquid crystal layer, wherein the black matrix has at least one hole formed therein to allow structured light from the liquid crystal layer to pass therethrough.

10. A method for manufacturing the display panel according to claim 2, comprising:

disposing at least one light source on an array substrate;

forming at least one modulation electrode above the at least one light source;

forming a liquid crystal layer above the at least one modulation electrode; and forming a black matrix above the liquid crystal layer, wherein the black matrix has at least one hole formed therein to allow structured light from the liquid crystal layer to pass therethrough.

11. The display panel according to claim 1, wherein the light receiving unit is located between the modulation structure and the array substrate.

12. The display panel according to claim 11, wherein there are filters disposed at the at least one hole.

13. The display panel according to claim 1, further comprising: a gesture recognition unit configured to acquire a gesture of the measured object based on the reflected structured light.

14. A display apparatus, comprising the display panel according to claim 13.

15. A display apparatus, comprising:

the display panel according to claim 1; and a gesture recognition unit, configured to acquire a gesture of the measured object based on the reflected structured light.

16. A method for manufacturing the display panel according to claim 1, comprising:

disposing a light receiving unit and a light emitting unit on an array substrate;

forming a modulation structure above the light emitting unit and the light receiving unit; and forming a black matrix above the modulation structure, wherein the black matrix has at least one hole formed therein to allow structured light from the modulation structure to pass therethrough.

* * * * *